L. C. MARBURG.
SYSTEM OF ELECTRICAL DISTRIBUTION.
APPLICATION FILED JAN. 7, 1910.

1,048,985.

Patented Dec. 31, 1912.

Witnesses
John L. Johnson
Chas. L. Byron

Inventor
Louis C. Marburg
By Chas. E. Lord
Attorney

UNITED STATES PATENT OFFICE.

LOUIS C. MARBURG, OF MILWAUKEE, WISCONSIN, ASSIGNOR TO ALLIS-CHALMERS COMPANY, A CORPORATION OF NEW JERSEY.

SYSTEM OF ELECTRICAL DISTRIBUTION.

1,048,985.  Specification of Letters Patent.  Patented Dec. 31, 1912.

Application filed January 7, 1910. Serial No. 536,879.

*To all whom it may concern:*

Be it known that I, LOUIS C. MARBURG, a citizen of the United States, residing at Milwaukee, in the county of Milwaukee and State of Wisconsin, have invented certain new and useful Improvements in Systems of Electrical Distribution, of which the following is a full, clear, and exact specification.

My invention relates to systems of electrical distribution.

In many electrical installations the load is extremely fluctuating, the upper limit often being much above the capacity which for economy the generator is designed to have.

It is the object of my present invention to provide means for relieving the generator of the peaks of such a load.

In carrying out my invention a motor connected to the system is provided with a rotating member having large inertia, and is so controlled, preferably automatically, that when the other load on the line becomes unduly great the power required to drive the load on this motor is partly or wholly supplied by the kinetic energy stored in its rotating member, and is not demanded of the line. Preferably when the total load on the line is not excessive, the power demanded by this motor of the line is maintained substantially constant, the heavy rotating member storing and giving up energy as required to produce this result.

In the specific embodiments of my invention illustrated, the motor is of the wound rotor induction type, and in the secondary circuit thereof is a resistance which is normally controlled, in response to the current supplied to the motor, to maintain such current constant, but which, when the load on the line exceeds a predetermined value, is automatically increased to diminish the current taken by the motor from the line. This motor has a fly-wheel on its shaft, and drives a direct current generator supplying a direct current motor, the electro-motive force of this generator being variable and preferably reversible.

The various novel features of my invention will appear from the description and drawings, and will be particularly pointed out in the claims.

Figure 1:
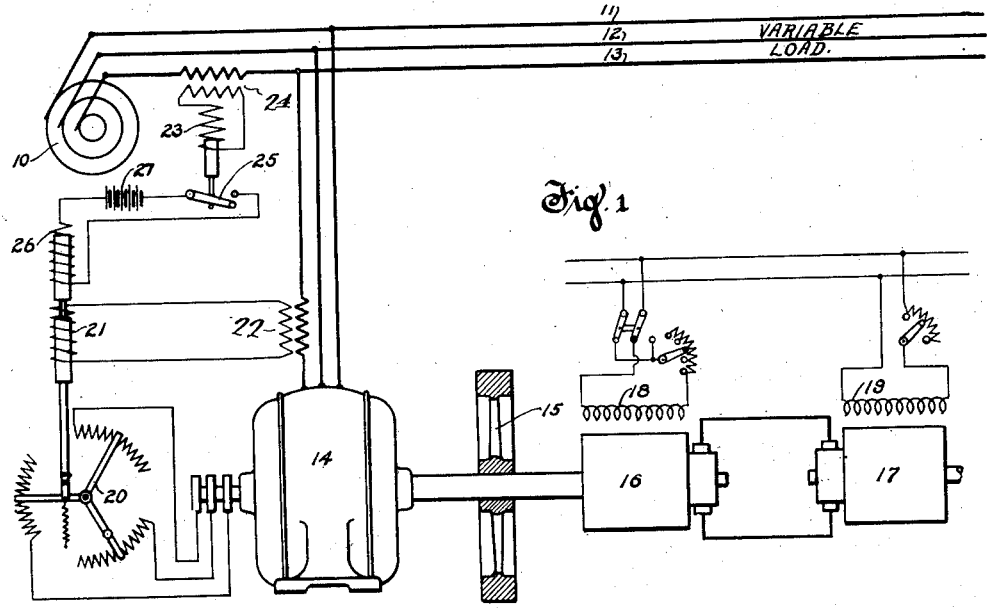
Figure 2:
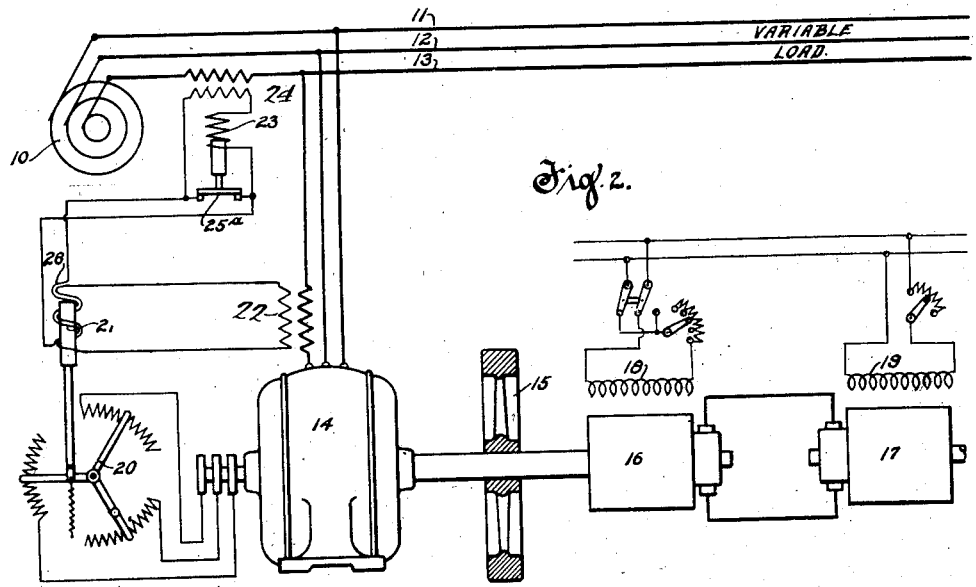

Figure 1 is a diagram showing one embodiment of my invention; and Fig. 2 shows a modification.

The generator 10 supplies the circuit 11—12—13, which carries a variable load of any nature. For instance the variations in load may be due to having as part of the load induction motors driving three-high rolling mills. The generator 10 is shown as a three-phase generator, but the invention in its broader aspects is not limited to alternating current systems. Part of the load on the circuit 11—12—13 consists of the motor 14, here shown as an induction motor of the wound rotor type. This motor is mechanically connected to a fly-wheel 15 and a generator 16, the latter supplying a motor 17 which may be used for any desired work, as, for instance, for driving a reversing rolling mill or a hoist. The machines 16 and 17 are here shown as direct current machines. The motor 17 is controlled by varying and if necessary reversing the current in the generator field winding 18; if desired, the current in the motor field winding 19 may also be variable. This control scheme may be of any desired character, that shown being merely illustrative. In the secondary circuit of the motor 14 is a variable three-phase resistance 20. This resistance 20 is primarily controlled by a solenoid 21, which is responsive to the current supplied to the motor 14, as through a current transformer 22 connected to the motor leads. This solenoid is preferably so designed that it moves its core throughout its entire range of movement for a very small change in current. Consequently, by means of this solenoid the resistance 20 is so varied that the current taken by the motor 14 under normal conditions is maintained substantially constant, any excess of energy supplied to the motor 14 over that demanded by the working motor 17 being stored as kinetic energy in the rotating fly-wheel 15, and the stored energy being given up when energy is demanded by the motor 17 at a greater rate than it is supplied to the motor 14. Indeed, under some circumstances the working motor 17 acts as generator driven by the momentum of its moving load and supplies electric energy to the machine 16, the latter now acting as motor and assisting the motor 14 to store energy in the fly-wheel 15. This is when the motor 17 is being braked.

The action above described takes place when the load on the circuit 11—12—13 does not exceed a certain predetermined value; it is somewhat different when such load exceeds such value. Then the current supplied by the generator 10 rises, and a solenoid 23 responsive to the total current supplied by the generator 10, as through a current transformer 24, operates a switch 25 or 25ª (in Figs. 1 and 2 respectively) and causes the energization of a solenoid 26 which assists the solenoid 21 and increases the amount of the resistance 20 in the secondary circuit of the motor 14. This cuts down the current which the motor 14 takes from the circuit 11—12—13, and thereby allows the generator 10 to carry more easily the excess of the other load on the circuit. The solenoids 26 and 21 may operate on the same core or on separate cores, and the solenoid 26 when energized may carry a variable or a constant current. In the arrangement shown in Fig. 1, it is supplied by a battery 27 and is energized when the solenoid 23 closes the switch 25. The pull of the solenoid 26 in this case has a predetermined value, and when the solenoid 26 is energized the current demanded by the motor 14 from the circuit 11—12—13 is diminished by a certain definite amount. In the arrangement shown in Fig. 2, the solenoid 26 is supplied by the same current transformer 24 which supplies the solenoid 23. However, the solenoid 26 is normally short-circuited by the switch 25ª, and is only energized when the solenoid 23 is energized sufficiently strongly to lift the switch 25ª and open such short-circuit. The solenoid 26 in this case when energized exerts a pull proportional to the total current supplied by the generator 10, so that the amount by which the current demanded by the motor 14 from the circuit 11—12—13 is diminished is also proportional to the total current supplied by said generator.

In some cases it may be desirable to dispense with the solenoid 21 and the current transformer 22, thus putting the resistance 20 entirely under the control of current supplied by the generator 10; and in such case the solenoid 23 and the switch 25ª (Fig. 2), may be either retained or dispensed with. In the first case the resistance 20 is controlled in response to the current supplied by the generator 10 only when such current exceeds a predetermined value, and in the second case it is controlled by such current at all times.

Although my invention has been particularly described in relation to one particular embodiment, it is not limited thereto. Thus the large inertia needed in the moving parts may be inherent in the rotor of the motor 14 or may be attained by having a separate fly-wheel mechanically connected to such rotor, as by being mounted on the same shaft therewith; both forms are included when such expressions as "a rotating member of large inertia" are used. The motor which drives the fly-wheel may be of any desired type and may do any desired work. If it is used as the motive part of a dynamo-electric transformer, such transformer may be of any desired type and is not limited to the arrangement as shown where the motive part is an induction motor and the generator part a direct current generator.

Many other modifications may be made in the precise arrangements here shown and described, and all such which do not involve a departure from the spirit and scope of my invention are intended to be covered in the following claims.

What I claim as new is:

1. In combination, a generator, a circuit supplied thereby, a variable load carried by said circuit and including an electric motor having a rotating member of large inertia, said motor doing other work besides driving its own rotating member, and means for maintaining constant the current taken by said motor from the circuit when the current supplied by said generator is below a predetermined value, and for diminishing the current taken by said motor when the current supplied by said generator exceeds such predetermined value.

2. In combination, a generator, a circuit supplied thereby, a variable load carried by said circuit and including an electric motor having a rotating member of large inertia, a load driven by said motor, and means for controlling the current taken by said motor both in response to such current itself and to the total current supplied by said generator.

3. In combination, a generator, a circuit supplied thereby, a variable load on said circuit including an electric motor having a rotating member of large inertia, a load on said motor, and means for controlling the current taken by said motor from the line, said means under certain conditions being responsive to said current itself and under other conditions being responsive both to said current and to the total current supplied by said generator.

4. In combination, an alternating current generator, an alternating current circuit supplied thereby, a variable load on said circuit including an alternating current motor having a rotating member of large inertia and carrying a variable load, and means responsive both to the current taken by said motor and to the total current supplied by said generator for controlling the current taken by said motor.

5. In combination, an alternating current generator, an alternating current circuit supplied thereby, a variable load on said circuit including an alternating current motor having a rotating member of large inertia and carrying a variable load, and means for varying the current taken by said motor, said means being responsive to such current when the total current supplied by said generator is below a predetermined value and responsive to the current taken by the motor and to the total current supplied by said generator when the latter current is above a predetermined value.

6. In combination, an alternating current generator, an alternating current circuit supplied thereby, a variable load carried by said circuit and including an induction motor of the wound rotor type, said motor having a rotating member of large inertia and carrying a load, and means responsive both to the current taken by said motor and to the total current supplied by said generator for varying the resistance of the secondary circuit of said motor.

7. In combination, an alternating current generator, an alternating current circuit supplied thereby, a variable load carried by said circuit and including an induction motor of the wound rotor type, said motor having a rotating member of large inertia and carrying a load, and means for varying the resistance of the secondary circuit of said motor, said means being solely responsive to the current supplied to the motor when the total current supplied by said generator is below the predetermined value, and being responsive both to the current supplied to the motor and to the total current supplied by said generator when said latter current exceeds a predetermined value.

8. In combination, an alternating current generator, an alternating current circuit supplied thereby, a variable load carried by said circuit and including an induction motor of the wound rotor type, said motor having a rotating member of large inertia and carrying a load, and means for varying the resistance of the secondary circuit of said motor, said means being solely responsive to the current supplied to the motor when the total current supplied by said generator is below a predetermined value, and being responsive to the total current supplied by said generator when said latter current exceeds a predetermined value.

9. In combination, an electric generator, an electric circuit supplied thereby, a variable load on said circuit including a dynamo-electric transformer having a rotating member of large inertia, a translating device supplied from said dynamo-electric transformer, and means for controlling the current taken by said dynamo-electric transformer from said circuit, said means being controlled both by said current and by the total current supplied by said generator.

10. In combination, an electric generator, an electric circuit supplied thereby, a variable load on said circuit including a dynamo-electric transformer having a rotating member of large inertia, a translating device supplied from said dynamo-electric transformer, and means for varying the current taken from said circuit by said dynamo-electric transformer, said means being responsive to said current alone when the total current supplied by said generator is below a predetermined value, and both to the current taken by said dynamo-electric machine from the circuit and to the total current supplied by said generator when said total current exceeds a predetermined value.

11. In combination, an alternating current generator, an alternating current circuit supplied thereby, a variable load on said circuit including an electric motor, a fly-wheel and a second generator driven by said motor, a translating device supplied by said second generator, and means for maintaining constant the current taken by said induction motor from said circuit while the total current supplied by said first generator is below a predetermined value and for diminishing the current taken by said induction motor when the total current supplied by said first generator exceeds a predetermined value.

12. In combination, an alternating current generator, an alternating current circuit supplied thereby, a variable load on said circuit including an electric motor, a fly-wheel and a second generator driven by said motor, a translating device supplied by said second generator, and means for controlling the current taken by said induction motor, said means being responsive both to such current and to the total current supplied by said first generator.

13. In combination, an alternating current generator, an alternating current circuit supplied thereby, a variable load on said circuit, said load including an induction motor of the wound rotor type, a fly-wheel and a second generator driven by said induction motor, a translating device supplied by said second generator, a resistance in the secondary circuit of said induction motor, and means responsive both to the total current supplied by said generator and to the current taken by said induction motor for controlling said resistance.

14. In combination, an alternating current generator, an alternating current circuit supplied thereby, a variable load on said circuit, said load including an induction motor of the wound rotor type, a flywheel and a second generator driven by said induction motor, a translating device supplied by said second generator, a resistance in the secondary circuit of said induction motor, and means for controlling said resistance so that the current taken by said motor is maintained constant while the total current supplied by said first generator is below a predetermined value and is diminished when said total current exceeds a predetermined value.

Milwaukee, Wisconsin, December 20, 1909.

In testimony whereof I affix my signature, in the presence of two witnesses.

LOUIS C. MARBURG.

Witnesses:
ALEX. J. NICHT, Jr.,
CHAS. L. BYRON.